Feb. 17, 1942.    W. OHNESORGE ET AL    2,273,135
ELECTRIC CABLE
Filed Jan. 15, 1938
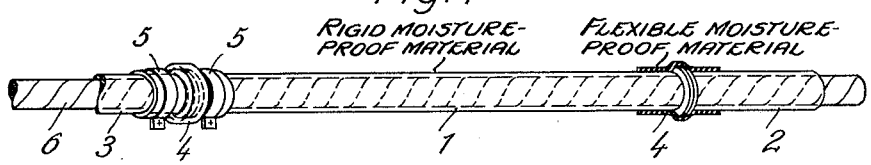
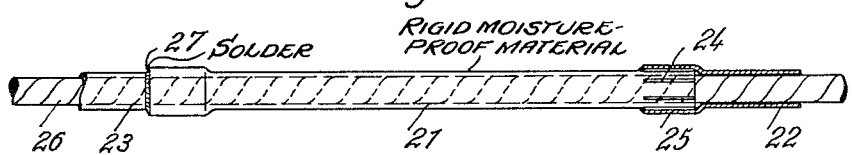
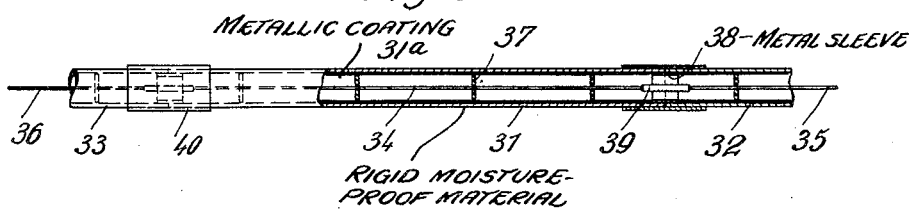
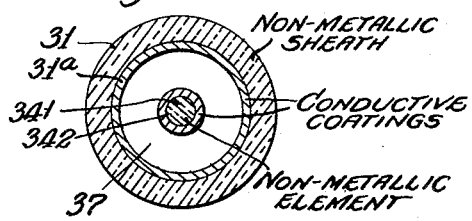

Patented Feb. 17, 1942

2,273,135

UNITED STATES PATENT OFFICE 2,273,135

ELECTRIC CABLE

Wilhelm Ohnesorge, Berlin - Charlottenburg, Günter Flanze, Berlin-Lichtenrade, and Friedrich Gladenbeck, Berlin-Charlottenburg, Germany Application January 15, 1938, Serial No. 185,106
In Germany December 22, 1936

3 Claims. (Cl. 174—28)

The present invention relates to electric cables provided with a protective sheath applied to the cable core.

In the manufacture of cables for power and communication circuits lead, copper and in part also iron are particularly employed. Attempts have been made to reduce the amount of copper hitherto required by a more advantageous utilization of the copper conductors. The air-space insulated concentric or symmetric high-frequency cable which is utilized for carrier-current transmission forms at present the last stage of this development. In order to effect a saving in lead which is chiefly employed in the manufacture of the cable protective sheathing, the chemical industry has developed non-metallic protective means which may be applied to the lead sheath and which permit to reduce the thickness of the lead sheath to a great extent. The chemical industry has also developed non-metallic materials which may be used instead of lead for the manufacture of flexible protective sheaths.

The object of the present invention is to provide a cable in which a novel type of protective sheath applied to the cable core is employed, thus dispensing on the one hand entirely with the hitherto usual metallic protective sheathing as well as with the iron armoring and considerably reducing on the other hand also the use of metal for the inner conductors in the case of high-frequency transmission.

The nature of the invention consists in surrounding the insulated cable core by a protective sheathing which is composed of assembled rigid short tubular sectional elements of a moisture-proof and practically inflexible material such as glass, porcelain, pressed material and the like, the final connection of which takes place during or after the laying. This protective sheathing is not to constitute any part of the insulation of the cable conductors, the cable core as such being insulated in a manner which is the same or similar to that which has hitherto been customary with lead-sheathed cables. The construction of the protective sheathing of rigid elements according to the invention provides new possibilities for building up the cable cores.

The invention will be now explained by way of example.

Tubular or shaped sectional elements of rigid (i. e. practically inflexible) and moisture-proof material may be provided at their ends with flanges or grooves. These elements replace the hitherto usual flexible protective sheath applied to the insulated cable core and are fitted together when or after laying the cables in the ground. In the case of low-frequency transmission a tubular duct is preferably first prepared by fitting the tubular or shaped sectional elements together and the insulated copper conductors bunched together (constituting the finished cable core) are then drawn into this duct. It is also possible to manufacture a number of sections of the low-frequency cable and to surround them at the same time with shaped elements of the rigid moisture-proof sheath. These elements or components of the protective sheath, provided during manufacture with the cable core parts, are placed together end to end during the laying of the cable and the connection or joining of the corresponding inner and outer parts is then proceeded with. In this case the conductors of the cable core are spliced to each other in a known manner, and the tubular or shaped elements are connected together in a moisture-proof manner so as to provide as much flexibility as possible. If the sheath is to afford in this case a protection not only against mechanical and chemical influences, but also against inductive and capacitive influences it is often convenient to render the elements of the cable sheath conductive by applying thereto a metallic layer which need not be highly conductive so that currents can flow over the surface of the cable sheath. The metallization is preferably effected in such a manner that at the points of connection of the tubular sectional elements there is attained not only a mechanical sealing but simultaneously with their connection electrical contact of the points of connection is obtained, i. e. favorable electric bridging contacts are made.

The use of the invention is particularly advantageous with cables intended for high-frequency transmission. It is only necessary, when using the sheath according to the invention, to position one or more inner conductors in the interior of the sheath in a given position by known spacers. Thus, the sheath sections with a metal layer may be provided with one or more inner conductors which are held therein by spacers in a known manner. In this case concentric or symmetric or also multiple conductor cables are obtained depending upon the construction of the cable. Since the individual cable sections need not be wound on a reel it is no longer necessary to manufacture the inner conductors of flexible material as has hitherto been the case. The inner conductors are also made according to the invention of rigid material, particularly of glass, and are provided with a metallic coating. Glass resistant to rupture is particularly advantageous for the protective sheath and/or the supporting cores for the inner conductors. The two methods indicated above for low-frequency cables may also be adopted for high-frequency cables, i. e. the tubular sectional element may either first be laid at intervals and then the cable core drawn in, or the cable sections may be built separately in the factory and only joined together when laying. The inner conductors may be easily connected by placing thereover small ferrules or the like. In high frequency cables the connection of the metallized sheath may also be effected as above described.

Since flexibility, which has hitherto been necessary to permit of winding the cable on drums, can be dispensed with, according to the invention concentric or symmetrical cables can also be made by surrounding the inner conductor or conductors by a plurality of tubular pieces, in particular arranged concentrically, and which are coated on the inside or outside with metal or have been metallized in some other way.

The above-mentioned types of cables may be manufactured according to the invention in such a manner that the moisture entering the sheath space when laying the cable is removed which may be easily done, for instance, by forcing therethrough a current of dry air, moisture-absorbing gases or the like. In this case care should be taken to design the cable sheath or sheaths in such a manner as to present sufficiently large spaces and the spacers of the current carrying conductors so as to permit a free passage of the air.

It may be further pointed out that the cables manufactured according to the invention may be easily connected to cables of the hitherto usual type and may cooperate therewith without any difficulties.

Furthermore, the invention presents the advantage that the noxious formation of eddy currents is suppressed. When applying a metallic layer to rigid material which is not electrically conductive all eddy currents which do not flow in the longitudinal direction of the cable may be suppressed by subdividing the layer in a suitable manner.

It is possible that in some countries owing to earthquakes or the like the mechanical stress of the cable may attain an unduly high value. In this case the cable is embedded in a solid covering in such a manner as to be flexibly supported within the hollow body; for instance, by suspending the cable resiliently or by embedding it in a plastic or elastic compound.

In the accompanying drawing is shown some embodiments of the invention in diagrammatic form. Figs. 1 and 2 are two embodiments of the invention in which the cable cores insulated in the factory are arranged in the cable sheaths composed of tubular elements or pipe sections. Fig. 3 shows an embodiment in which the pipe sections are provided in the factory with inner conductors and the latter are connected when laying the pipe sections. Fig. 4 shows diagrammatically a cross section through another embodiment.

In Fig. 1, 1 denotes a pipe section provided at both ends with flanges against which abut the flanges of the adjacent pipe sections 2 and 3. In order to make the joint of the pipe sections flexible and at the same time moisture-proof a hose coupling 4 is placed over the ends of the pipe sections, the hose coupling 4 being firmly clamped thereto by means of clamps 5. The hose coupling 4 may besides be cemented to the pipe sections in order to attain a better sealing. Furthermore, it may be protected exteriorly by placing around the hose coupling strips of sheet iron (not shown). In Fig. 1 at the right-hand joint the hose coupling 4 is shown in cross-section without clips, whereas at the left-hand joint is shown a view thereof with clamps. The cable core 6 is drawn in the usual manner into the assembled pipe composed of the pipe sections 1, 2, 3 etc.

In Fig. 2 the pipe section 21 is designed in the form of the known cast-iron socket pipes, the straight end of which is, for instance, provided with longitudinal ribs 24 having a length of 5 to 10 cm. and the socket end of which is provided with corresponding grooves. The ribs and grooves are uniformly distributed over the periphery and serve to prevent the pipe sections from rotating and at the same time to distribute the sealing mass 25 poured into the remaining interstitial space between the two engaged pipe ends. This sealing mass may, for instance, consist of bitumen, a plastic composition or the like. The joint between the pipe section 21 and the adjacent pipe section 22 at the right is shown in cross-section, whereas at the left is shown a view of the joint between the pipe section 21 and the adjacent pipe section 23, from which will be seen the soldering and welding material 27 serving as a seal for the joint. In order to effect the welding, the contact surfaces of the pipe sections are metallized. Also in this case the cable core 26 is protected against mechanical stresses and moisture.

Fig. 3 shows a pipe section 31 which is provided inside with a metal coating 31ª serving as an outer cable conductor and is connected to the corresponding pipe sections 32 and 33. The inner conductors 34, 35 and 36 are centrally supported, for instance, by means of discs 37, some of which are shown. At the joints of the pipe sections are inserted inside metal sleeves 38 which electrically connect the outer conductor coatings 31a arranged on the inner walls of the pipe sections. The inner conductors 34 are connected with one another by means of the ferrules 39. Over the joint of pipe sections 31, 32, 33 are arranged lead sleeves 40 soldered to the pipe sections. To render the joints flexible the metallic sleeves 38 and the ferrules 39 may be slotted or applied to the conductors in a resilient manner. The right-hand joint is shown in cross-section and at the left hand a view thereof is shown.

The embodiment shown in Fig. 4 is in general similar to that of Fig. 3, as is apparent from the same reference numerals which in both figures designate similar elements. However, the inner conductor in the embodiment of Fig. 4 is composed of a non-metallic element 341, for instance of glass of high dielectric constant, and of a metallic coating 342 which is disposed on element 341 and forms the inner conductor proper.

We claim:

1. An electric underground cable having a plurality of sectional members, each of said members comprising a central conductor, insulating spacing means surrounding said conductor, and a protective sheath of a moisture-proof non-metallic and substantially rigid material immediately and closely surrounding said spacers and forming the only mechanically resistant enclosure of the sectional member, said sheath and said central conductor being of substantially equal lengths and having their ends shaped to engage the respective elements of the adjacent sectional members, and a conductive coating disposed on the inner surface of said sheath to form another conductor.

2. An electric cable composed of a plurality of sectional members, each of said members comprising an inner element of substantially rigid and electrically non-conducting material, a conductive coating on said element to form an inner conductor, insulating spacing means mounted on said inner element, a protective sheath element of tubular shape immediately and tightly surrounding said spacing means and consisting of rigid non-metallic material, a conductive coating on the inner surface of said sheath element forming another conductor, said inner element and said sheath element having substantially the same lengths and having their ends shaped to be joined with the respective elements of the adjacent members, and means for joining the ends mechanically and conductively when the cable is laid whereby a continuous inner and outer conductor and a continuous protective sheath is formed.

3. An electric cable composed of a plurality of sectional members, each of said members comprising an inner element of glass of high dielectric strength, a conductive coating on said element to form an inner conductor, insulating spacing means mounted on said inner element, a protective sheath element of tubular shape immediately and tightly surrounding said spacing means and consisting of rigid non-metallic material, a conductive coating on the inner surface of said sheath element forming another conductor, said inner element and said sheath element having substantially the same lengths and having their ends shaped to be joined with the respective elements of the adjacent members, and means for joining the end mechanically and conductively when the cable is laid whereby a continuous inner and outer conductor and a continuous protective sheath is formed.

WILHELM OHNESORGE.
GÜNTER FLANZE.
FRIEDRICH GLADENBECK.